(12) United States Patent
Nagasawa

(10) Patent No.: US 9,862,305 B2
(45) Date of Patent: Jan. 9, 2018

(54) VEHICLE HEADLIGHT DEVICE

(71) Applicant: Fuji Jukogyo Kabushiki Kaisha, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/865,960

(22) Filed: Sep. 25, 2015

(65) Prior Publication Data

US 2016/0090025 A1 Mar. 31, 2016

(30) Foreign Application Priority Data

Sep. 30, 2014 (JP) ................................ 2014-200691

(51) Int. Cl.
*B60Q 1/14* (2006.01)
*B60Q 1/04* (2006.01)

(52) U.S. Cl.
CPC ........ *B60Q 1/143* (2013.01); *B60Q 2300/054* (2013.01); *B60Q 2300/112* (2013.01); *B60Q 2300/23* (2013.01); *B60Q 2300/322* (2013.01)

(58) Field of Classification Search
CPC ...... B60Q 1/16; B60Q 1/143; B60Q 2300/32; B60Q 2300/112; B60Q 2300/053; B60Q 2400/50; B60Q 1/08; B60Q 1/085; F21W 2101/10
See application file for complete search history.

(56) References Cited

U.S. PATENT DOCUMENTS

2003/0031008 A1* 2/2003 Kobayashi ............. B60Q 1/085
362/37
2005/0275562 A1* 12/2005 Watanabe .............. B60Q 1/085
340/933
2009/0043458 A1* 2/2009 Kamioka ............... B60Q 1/085
701/49

(Continued)

FOREIGN PATENT DOCUMENTS

JP 2006-021632 A 1/2006
JP 2010-000893 A 1/2010

(Continued)

OTHER PUBLICATIONS

Japanese Office Action in Japanese Patent Application No. No. 2014-200691 filed on Feb. 2, 2016.

*Primary Examiner* — Anh Mai
*Assistant Examiner* — Nathaniel Lee
(74) *Attorney, Agent, or Firm* — Troutman Sanders LLP

(57) ABSTRACT

A vehicle headlight device includes a variable light distribution mechanism that is able to change an illuminating area of light emitted ahead of a vehicle equipped with the vehicle headlight device from at least one light source, and is able to illuminate part of the illuminating area at a higher intensity than other parts, a direct field of vision estimator that estimates a direct field of vision on which a vehicle operator is assumed to keep his/her eyes within an area ahead of the vehicle; and a light distribution controller that sets the illuminating area so as to contain the direct field of vision estimated by the direct field of vision estimator, and controls the variable light distribution mechanism to illuminate an area corresponding to the direct field of vision at a higher intensity than a periphery of the area.

14 Claims, 5 Drawing Sheets

(56) References Cited

U.S. PATENT DOCUMENTS

| 2011/0194302 | A1* | 8/2011 | Kishimoto | ........... | F21S 48/1154 |
| | | | | | 362/511 |
| 2015/0092431 | A1* | 4/2015 | Schneider | .............. | B60Q 1/143 |
| | | | | | 362/466 |

FOREIGN PATENT DOCUMENTS

| JP | 2011-157023 A | 8/2011 |
| JP | 2014-008913 A | 1/2014 |

\* cited by examiner

VEHICLE HEADLIGHT DEVICE

CROSS-REFERENCE TO RELATED APPLICATION

The present application claims priority from Japanese Patent Application No. 2014-200691 filed on Sep. 30, 2014, the entire contents of which are hereby incorporated by reference.

BACKGROUND

1. Technical Field

The present disclosure relates to a vehicle headlight device mounted to a vehicle, and particularly to the vehicle headlight device which reduces a burden of a vehicle operator when the vehicle travels in the dark.

2. Related Art

Headlight devices mounted to vehicles, such as automobiles, are typically configured to be provided with a plurality of lighting systems having different light distribution characteristics (e.g., different illuminating areas), for example, caused by high beam (driving beam) headlights and low beam (passing beam) headlights, of which light sources are selectively turned on and off according to a traveling state of the vehicles. Recently, Adaptive Front-lighting System (AFS) that automatically changes the illuminating area, for example, according to the traveling state of the vehicles has been proposed. For example, Japanese Unexamined Patent Application Publication (JP-A) No. 2014-008913 discloses a headlight device that reduces a glare to oncoming automobile(s), pedestrian(s), etc. by changing the intensity and angle of the illumination according to a traveling speed of the vehicles.

It is common that the conventional headlight devices are configured to illuminate within a preset illuminating area at an intensity (brightness) as uniform as possible. However, human tends to instinctively gaze at or keep his/her eyes on a bright spot within his/her field of vision. Thus, if the inside of the illuminating area is illuminated substantially at the same intensity, the person is uneasy to set his/her line of sight. Therefore, there is a problem that the tension of the vehicle operator increases, and he/she gets fatigued.

SUMMARY OF THE INVENTION

One purpose of the present disclosure is made in view of the situations described above, and is to provide a vehicle headlight device that reduces a burden of a vehicle operator when a vehicle travels in the dark.

An aspect of the present disclosure provides a vehicle headlight device that includes a variable light distribution mechanism that is able to change an illuminating area of light emitted ahead of a vehicle equipped with the vehicle headlight device from at least one light source, and is able to illuminate part of the illuminating area at a higher intensity than other parts, a direct field of vision estimator that estimates a direct field of vision on which a vehicle operator is assumed to keep his/her eyes within an area ahead of the vehicle, and a light distribution controller that sets the illuminating area so as to contain the direct field of vision estimated by the direct field of vision estimator, and controls the variable light distribution mechanism to illuminate an area corresponding to the direct field of vision at a higher intensity than a periphery of the area.

The direct field of vision estimator may be provided with a lane shape detector that detects a shape of a lane ahead of the vehicle, and may estimate an area through which the vehicle will pass after a predetermined period of time as the direct field of vision.

The direct field of vision estimator may be provided with a line of sight detector that detects a line of sight of the operator, and may estimate an area containing the line of sight as the direct field of vision.

The direct field of vision estimator may change the direct field of vision so as to be relatively displaced forward of the vehicle and smaller as a traveling speed of the vehicle increases.

The light distribution controller may reduce the intensity at the periphery of the area corresponding to the direct field of vision as the traveling speed of the vehicle increases.

The at least one light source may include multiple light sources including a light source that illuminates the periphery of the area corresponding to the direct field of vision, and the light distribution controller may cause the light source which illuminates the periphery of the area corresponding to the direct field of vision to blink at a predetermined cycle.

The light distribution controller may control the variable light distribution mechanism to illuminate the area corresponding to the direct field of vision with light of a color different from a color of light illuminating the periphery of the area.

The vehicle headlight device may further include a laser beam emitter that emits a laser beam along an peripheral edge of the area corresponding to the direct field of vision.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

The present disclosure achieves the purpose to provide the vehicle headlight device which reduces the burden of the vehicle operator when the vehicle travels in the dark, by illuminating a "direct field of vision" on which the operator is assumed to keep his/her eyes at a higher intensity than the periphery thereof so that the operator's line of sight is guided into the direct field of vision.

Implementation 1

Hereinafter, Implementation 1 of the vehicle headlight device to which the present disclosure is applied (hereinafter, referred to as "the headlight device") will be described. The headlight device of Implementation 1 is mounted to a vehicle (hereinafter, referred to as "the vehicle"), such as an automobile or a passenger car, and illuminates ahead of the vehicle to secure a field of view of a vehicle operator when the vehicle travels in the dark. The phrase "traveling in the dark" as used herein includes traveling at night or traveling in a tunnel, etc.

Figure 1:
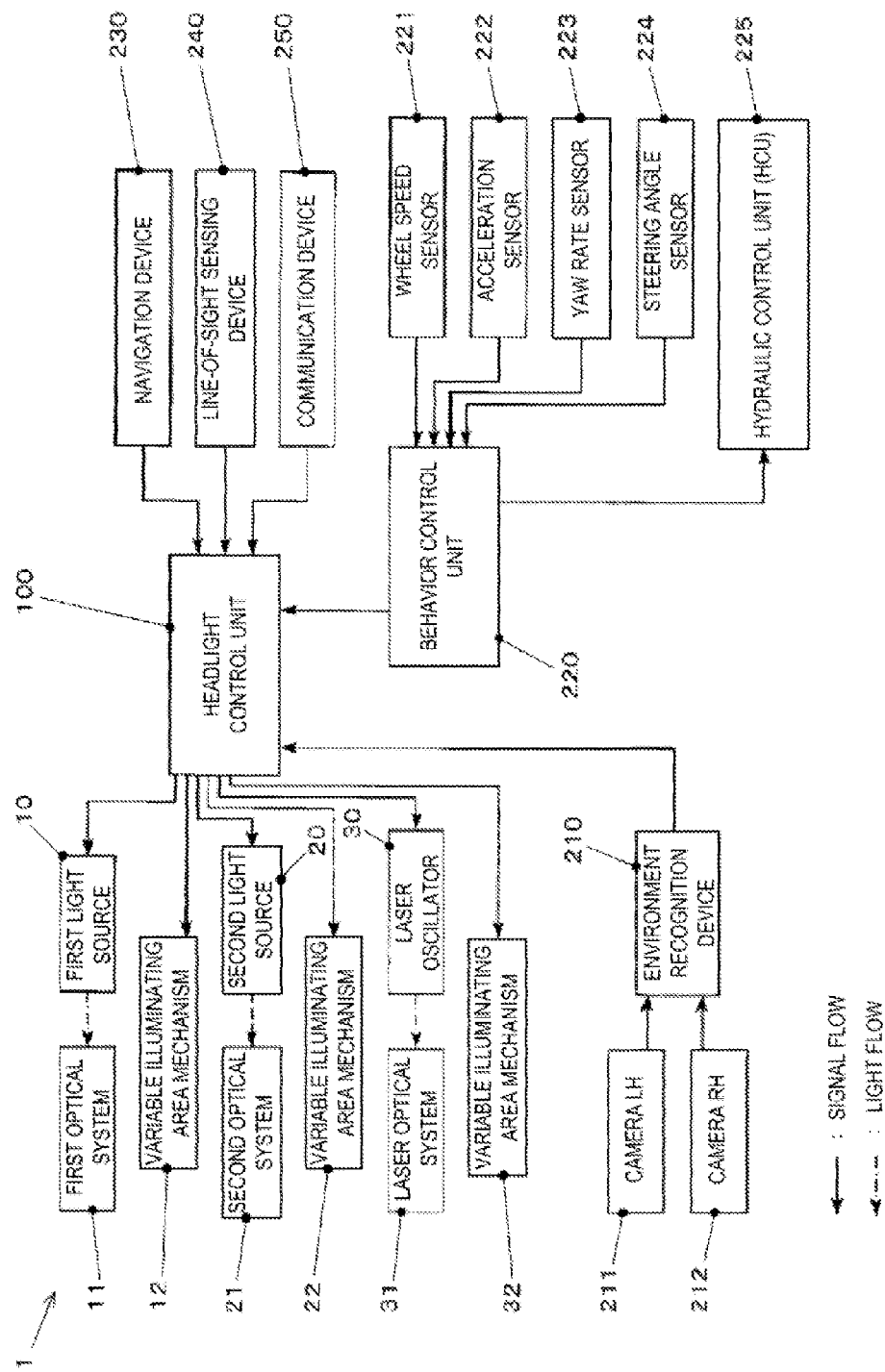
FIG. 1 is a block diagram schematically illustrating a configuration of Implementation 1 of a vehicle headlight device to which the present disclosure is applied.

FIG. 1 is a block diagram schematically illustrating a configuration of the headlight device of Implementation 1. As illustrated in FIG. 1, the headlight device 1 is comprised of a first light source 10, a first optical system 11, a (first) variable illuminating area mechanism 12, a second light source 20, a second optical system 21, a (second) variable illuminating area mechanism 22, a laser oscillator 30, a laser optical system 31, a (third) variable illuminating area mechanism 32, and a headlight control unit 100. Note that, for example, any number of the headlight devices 1 may be provided, and in this implementation, one pair of the headlight devices 1 are provided so as to be separated from each other in vehicle width directions in a front end part of a vehicle body. Note that the first light source 10, the first optical system 11, the first variable illuminating area mechanism 12, the second light source 20, the second optical system 21, the second variable illuminating area mechanism 22 may function as a variable light distribution mechanism in one implementation. Note that the laser oscillator 30, the laser optical system 31, and the third variable illuminating area mechanism 32 may function as a laser beam emitter in one implementation.

Each of the first light source 10 and the second light source 20 has, for example, a light source such as a high-intensity discharge bulb, and a power unit which supplies power to the bulb. The first light source 10 and the second light source 20 are switchable of on and off of the light source independently from each other. Further, at least one of the light sources, e.g., the second light source 20 in this implementation, can change its quantity of light when it is lit, by a plurality of steps or steplessly. The first optical system 11 and the second optical system 21 illuminate ahead of the vehicle by the first light source 10 and the second light source 20 with a predetermined light distribution pattern, respectively. Alternatively, the first optical system 11 and the second optical system 21 may be comprised of a projection optical system (projector) having a variable shading mechanism which can arbitrarily change, for example, the width and shape of the light distribution pattern, respectively. The variable shading mechanism interrupts part of the optical path with a movable shade and projects a shadow (image) of the shade ahead of the vehicle to vary the light distribution characteristics. Alternatively, the variable shading mechanism may have a plurality of iris blades disposed annularly to continuously change the inner diameter (aperture) so that the illuminating angle is variable and the width of the illuminating area is continuously changeable. The first optical system 11 and the second optical system 21 are attached to the vehicle body, for example, via a 2-axis gimbal mechanism, respectively, so that their optical axes are pivotable with respect to the vehicle body both in vertical directions and in vehicle width directions. The variable illuminating area mechanisms 12 and 22 are provided to the gimbal mechanisms of the first optical system 11 and the second optical system 21, respectively, and they have actuators etc. to change the optical axes of the first optical system 11 and the second optical system 21 in response to an instruction from the headlight control unit 100.

The laser oscillator 30 receives power supply from a power unit (not illustrated) and generates a laser beam. The laser projector 31 emits the laser beam generated by the laser oscillator 30 to illuminate ahead of the vehicle with selectively changeable emitting patterns. The laser projector 31 is attached to the vehicle body, for example, via a 2-axis gimbal mechanism so that its optical axis is pivotable with respect to the vehicle body both in the vertical directions and the vehicle width directions. The variable illuminating area mechanism 32 is provided to the gimbal mechanism of the laser projector 31, and has an actuator etc. to change the optical axis of the laser projector 31 in response to an instruction from the headlight control unit 100.

The headlight control unit 100 totally controls the light sources, optical systems, and variable illuminating area mechanisms which are described above. The headlight control unit 100 is comprised of information processor(s) such as CPU(s), memory or memories such as RAM(s) and/or ROM(s), input/output interface(s), and a bus which connects these components. The headlight control unit 100 may function as a direct field of vision estimator and a light distribution controller in one implementation. The control of the headlight control unit 100 will be described later in detail.

The headlight control unit 100 is directly connected with an environment recognition device 210, a behavior control unit 220, a navigation device 230, a line-of-sight sensing device 240, a communication device 250, etc., or indirectly connected, for example, via an on-board LAN system such as a CAN communication system.

The environment recognition device 210 recognizes the shape of a lane where the vehicle is traveling, and relative positions of various objects which exist ahead of the vehicle with respect to the vehicle, for example, based on images which are obtained by imaging ahead of the vehicle. The environment recognition device 210 is provided with a stereo camera system which is comprised of a camera LH 211 and a camera RH 212. The camera LH 211 and the camera RH 212 image ahead of the vehicle at a predetermined angle of view, for example, by solid state image pickup devices, such as CMOSs or CCDs, and an optical system, such as lenses, provided at the incident side of the image pickup devices, respectively. Each of the camera LH 211 and the camera RH 212 acquires an image sequentially at a predetermined frame rate, and transmits the image to the environment recognition device 210. The camera LH 211 and the camera RH 212 are installed, for example, on a top end part of the windshield inside the cabin so as to be separated from each other in the vehicle width directions. The environment recognition device 210 utilizes a parallax of the cameras to be detectable of the relative positions of the photographic objects with respect to the vehicle by performing a known stereo image processing of the images from the camera LH 211 and the camera RH 212.

The behavior control unit 220 controls fluid pressures supplied to wheel cylinders of fluid-operated service brakes of the vehicle to perform, for example, an anti-lock brake control which prevents wheel locks at the time of braking, and a vehicle behavior control which controls behaviors, such as understeering and oversteering.

The behavior control unit 220 is connected with wheel speed sensors 221, an acceleration sensor 222, a yaw rate sensor 223, and a steering angle sensor 224, and is inputted with outputs from these sensors. Further, the behavior control unit 220 outputs a control command to a hydraulic control unit (HCU) 225.

The wheel speed sensor 221 is provided to a hub part of each wheel (left and right front wheels and left and right rear wheels), and outputs a traveling speed pulse signal which changes in frequency in proportion to a rotating speed of the corresponding wheel. The behavior control unit 220 can calculate the rotating speed of each wheel (substantially corresponding to the traveling speed of the vehicle when a slip ratio is minute) based on the interval of the traveling speed pulse signals. The acceleration sensor 222 detects accelerations which act on the vehicle body in the longitudinal directions and the vehicle width directions. The yaw rate sensor 223 detects a rotating speed of the vehicle body in yaw directions (about the vertical axis). The steering angle sensor 224 detects a steering angle of a steering system of the vehicle. The HCU 225 is comprised of a pump which pressurizes brake fluid, and a solenoid valve which supplies the obtained fluid pressure to the wheel cylinder of the corresponding wheel. The HCU 225 supplies a predetermined fluid pressure to the corresponding wheel cylinder to control the braking force of the corresponding wheel.

The behavior control unit 220 performs the anti-lock brake control which periodically reduces the wheel cylinder fluid pressure of the wheel concerned to reduce the braking force so that the wheel is resumed back to a rotating state based on the output from each sensor when the wheel lock at the time of braking is detected. Further, the behavior control unit 220 performs the behavior control which generates a moment in a direction which reduces the behavior using a difference of the left and right wheel braking forces when the oversteering or understeering behavior of the vehicle is detected.

Further, the behavior control unit 220 has a road surface friction coefficient estimating function to estimate a friction coefficient (μ) of a road surface where the vehicle is traveling. For example, the behavior control unit 220 can calculate the estimated μ of the road surface based on the traveling speed and the steering angle, and based on a difference between a yaw rate which is estimated from a predetermined model of the vehicle and an actual yaw rate. Further, the behavior control unit 220 can calculate a stoppable distance which is a minimum distance at which the vehicle can stop safely with a deceleration caused by braking, based on the estimated μ and the traveling speed.

The navigation device 230 has a memory or memories, such as HDD(s), in which map data containing information about road shapes etc. is stored, and a vehicle position measurer, such as a GPS system.

The line-of-sight sensing device 240 is provided, for example, to an instrument panel, and has an imager which images the operator, and an image processor which extracts the contour image of the operator's pupils by carrying out image processing of the image obtained by the imager to detect a line of sight of the operator.

The communication device 250 is connected with a communication network, such as the Internet, and acquires varieties of information, such as weather information.

Figure 2:
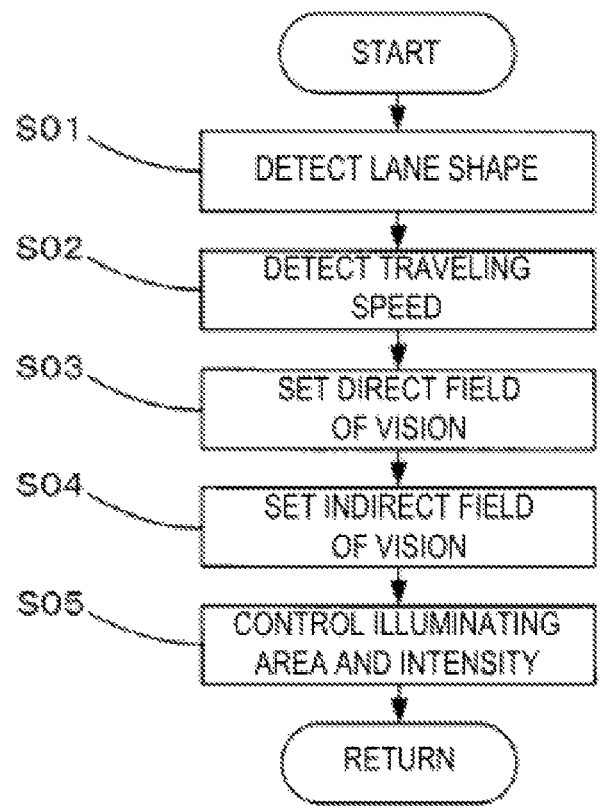
FIG. 2 is a flowchart illustrating a control of the vehicle headlight device of Implementation 1.

Next, a control of the headlight control unit 100 in the headlight device of Implementation 1 will be described. FIG. 2 is a flowchart illustrating the control of the headlight control unit of Implementation 1. Hereinafter, the flowchart is described for every step in the order thereof.

<Step S01: Detection of Lane Shape>

The headlight control unit 100 detects the shape of a lane ahead of the vehicle, where the vehicle is currently traveling, such as a curvature and a gradient, based on the outputs from the environment recognition device 210, the navigation device 230, etc. The headlight control unit 100 then transits to Step S02.

<Step S02: Detection of Traveling Speed>

The headlight control unit 100 acquires information about the traveling speed of the vehicle from the behavior control unit 220. The headlight control unit 100 then transits to Step S03.

<Step S03: Setting of Direct Field of Vision>

The headlight control unit 100 sets the direct field of vision on which the operator is assumed to keep his/her eyes, on the traveling lane of the vehicle and within an area through which the vehicle is assumed to pass after a predetermined period of time. The direct field of vision is set so that the area thereof (i.e., an illuminating spot diameter) is located away from the vehicle and is smaller as the traveling speed of the vehicle increases. The headlight control unit 100 then transits to Step S04.

<Step S04: Setting of Indirect Field of Vision>

The headlight control unit 100 sets an indirect field of vision around the direct field of vision set at Step S03. The headlight control unit 100 then transits to Step S05.

<Step S05: Control of Illuminating Area and Intensity>

The headlight control unit 100 controls the variable illuminating area mechanism 12 and the variable illuminating area mechanism 22 to cause them to illuminate the direct field of vision by light emitted from the first light source 10 and illuminate both the direct field of vision and the indirect field of vision by light emitted from the second light source 20. That is, the direct field of vision is illuminated by the light of the first light source 10 and the light of the second light source 20 in an overlapped manner. Here, the quantities of light of the first light source 10 and the second light source 20 are controlled so that the intensity at the indirect field of vision is lower (darker) than that at the direct field of vision, and a difference in the intensity between the direct field of vision and the indirect field of vision is larger as the traveling speed of the vehicle increases. Note that the second light source that mainly illuminates the indirect field of vision may be blinked at a slow cycle which does not make the operator aware of the blinking so much. For example, the cycle may be a frequency from about 65 Hz to about 85 Hz. Further, the headlight control unit 100 controls the laser oscillator 30, the laser projector 31, the third variable illuminating area mechanism 32, etc. to cause them to emit the laser beam at a boundary between the direct field of vision and the indirect field of vision. Then, the headlight control unit 100 returns to Step S01 and repeats the series of processings described above.

Figure 3:
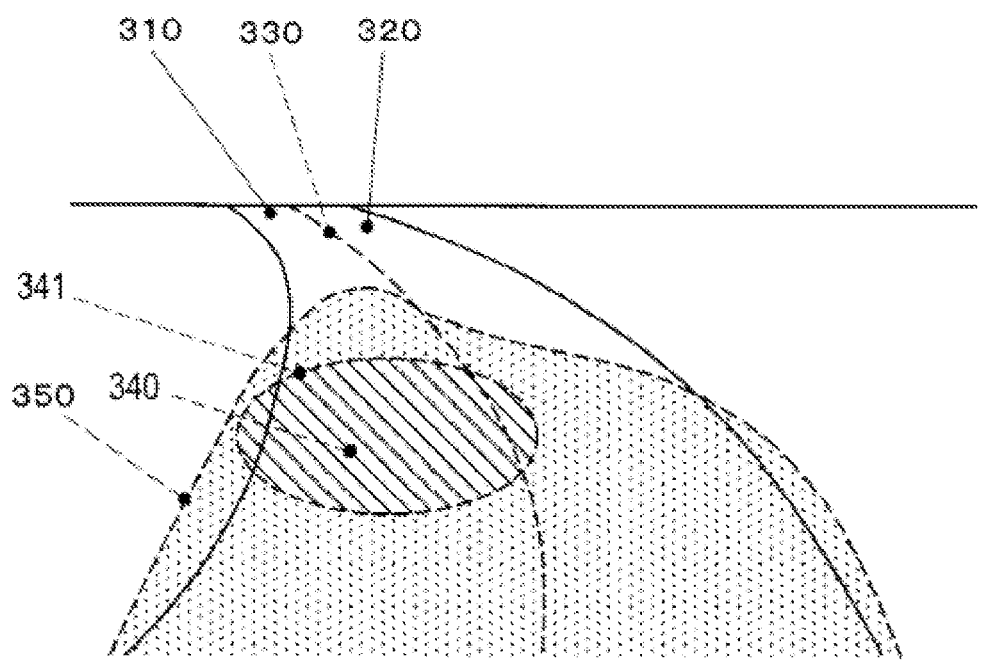
FIG. 3 is a view schematically illustrating one example of a light distribution pattern of the vehicle headlight device of Implementation 1 when a vehicle travels at a low speed.
Figure 4:
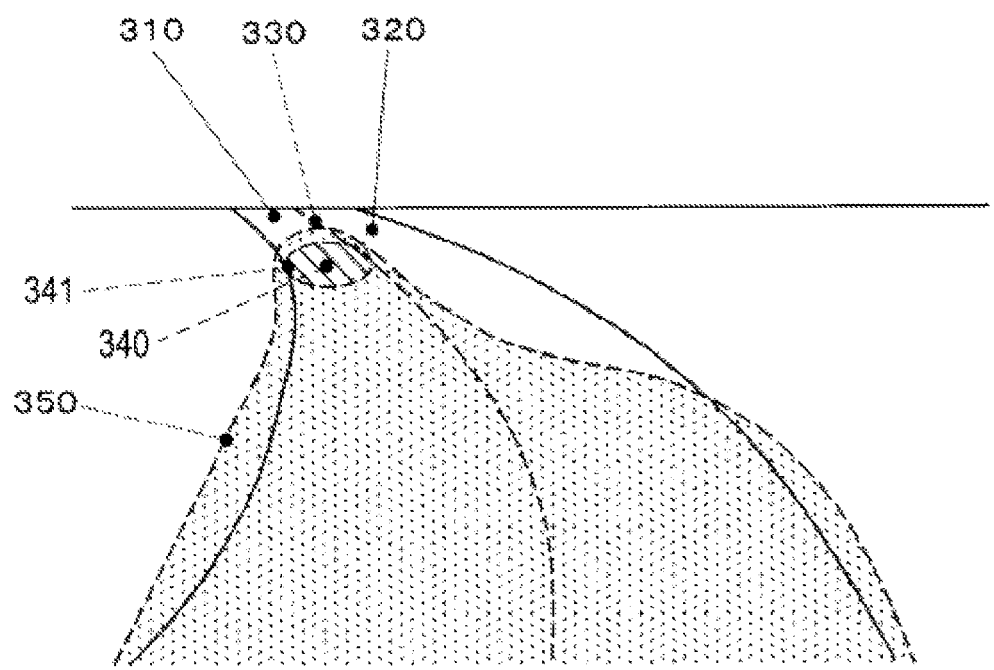
FIG. 4 is a view schematically illustrating one example of the light distribution pattern of the vehicle headlight device of Implementation 1 when the vehicle travels at a high speed.

Hereinafter, one example of the light distribution pattern in the headlight device of Implementation 1 will be described. FIG. 3 is a view schematically illustrating one example of the light distribution pattern in the headlight device of Implementation 1 when the vehicle travels at a low speed. FIG. 4 is a view schematically illustrating one example of the light distribution pattern in the headlight device of Implementation 1 when the vehicle travels at a high speed. FIGS. 3 and 4 schematically illustrate the operator's views. In FIGS. 3 and 4, a vehicle traveling lane 310, an opposite lane 320, a center line 330, etc. exist ahead of the vehicle.

As illustrated in FIG. 3, when the vehicle travels at a relatively low speed (a low-speed state), a direct field of vision 340 which is illuminated both by the first light source 10 and the second light source 20 is disposed at a position which is on the vehicle traveling lane 310 and is relatively close to the vehicle (toward the vehicle), and an indirect field of vision 350 which is illuminated only by the second light source 20 is disposed around the direct field of vision 340. The indirect field of vision 350 is set, for example, to cover an illuminating area of a common driving beam (i.e., high beam), and is provided with a cut-off line in order to reduce dazzles to other vehicles traveling in the opposite lane 320. The direct field of vision 340 is set so as to be contained inside the indirect field of vision 350, and have a higher intensity (brighter) than that of the indirect field of vision 350. Further, a peripheral edge 341 of the direct field of vision 340 (the boundary between the direct field of vision 340 and the indirect field of vision 350) is illuminated by the laser beam in the shape of a line circle (it appears in an ellipse when illuminated on the road surface).

As illustrated in FIG. 4, when the vehicle travels at a relatively high speed (a high-speed state), the direct field of vision 340 which is illuminated both by the first light source 10 and the second light source 20 is disposed at a position which is on the vehicle traveling lane 310 and is relatively distant from the vehicle (away from the vehicle), and the indirect field of vision 350 which is illuminated only by the second light source 20 is disposed around the direct field of vision 340. Further, the peripheral edge 341 of the direct field of vision 340 (the boundary between the direct field of vision 340 and the indirect field of vision 350) is illuminated by the laser beam. In the high-speed state illustrated in FIG. 4, the intensity difference between the direct field of vision 340 and the indirect field of vision 350 is set so as to be larger than that in the low-speed state illustrated in FIG. 3 by reducing the quantity of light from the light source 20, thereby more strongly guiding the operator's line of sight to the direct field of vision 340.

According to Implementation 1 described above, the direct field of vision 340 on which the operator is assumed to keep his/her eyes is illuminated at a relatively higher intensity than the surrounding indirect field of vision 350, to guide the operator's line of sight to the direct field of vision 340. Therefore, it can be prevented that the operator does not know where he/she set his/her line of sight, and thereby the operator's tension and his/her fatigue can be reduced. Further, the intensity at the indirect field of vision 350 is reduced with respect to the intensity at the direct field of vision 340. Therefore, it can be prevented that the operator senses a feeling of oppression which is caused by an excessive difference between brightness and darkness at a boundary between the area illuminated by the headlights and other non-illuminating area (an area around the indirect field of vision 350).

Implementation 2

Figure 5:
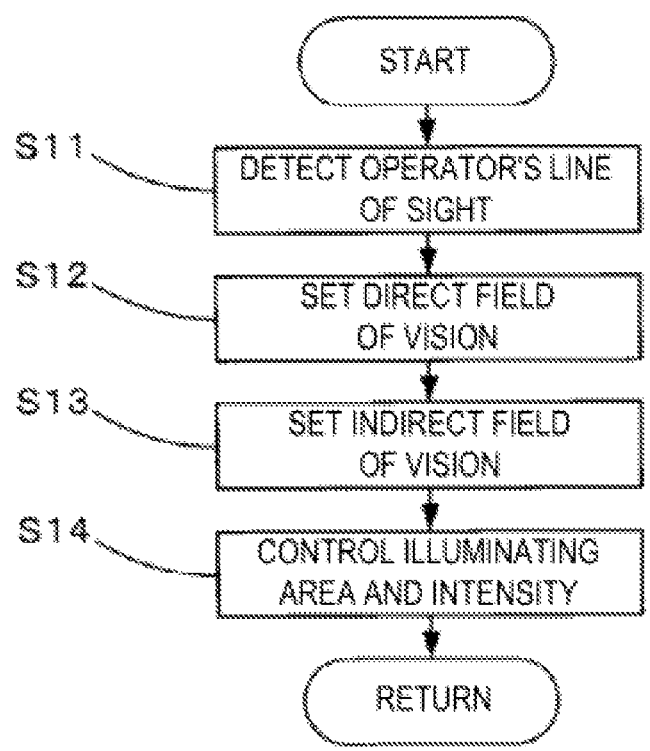
FIG. 5 is a flowchart illustrating a control of Implementation 2 of the vehicle headlight device to which the present disclosure is applied.

Next, Implementation 2 of the headlight device to which the present disclosure is applied will be described. The same reference numerals denote parts which are substantially the same as those of Implementation 1 to omit redundant description thereof, and differences between the implementations are mainly described. FIG. 5 is a flowchart illustrating a control of the headlight device of Implementation 2. Hereinafter, the flowchart is described for every step in the order thereof.

<Step S11: Detection of Operator's Line of Sight>

The headlight control unit 100 acquires information about the operator's line of sight from the line-of-sight sensing device 240. The headlight control unit 100 then transits to Step S12.

<Step S12: Setting of Direct Field of Vision>

The headlight control unit 100 sets the direct field of vision on which the operator is assumed to keep his/her eyes, on an extended line of the operator's line of sight detected at Step S11 and within an area near the extended line. The headlight control unit 100 then transits to Step S13.

<Step S13: Setting of Indirect Field of Vision>

The headlight control unit 100 sets the indirect field of vision around the direct field of vision set at Step S12. The headlight control unit 100 then transits to Step S14.

<Step S14: Control of Illuminating Area and Intensity>

The headlight control unit 100 controls the variable illuminating area mechanism 12 and the variable illuminating area mechanism 22 in a similar way to Step S05 of Implementation 1, to cause them to illuminate the direct field of vision by the light emitted from the first light source 10 and illuminate both the direct field of vision and the indirect field of vision by the light emitted from the second light source 20. Then, the headlight control unit 100 returns to Step S11 and repeats the series of processings described above.

As described above, according to Implementation 2, the operator's line of sight is detected, the direct field of vision is set based on the detected operator's line of sight, and the direct field of vision is illuminated so that the intensity at the direct field of vision is higher than the intensity at the indirect field of vision which is disposed around the direct field of vision. Therefore, the operator's line of sight can be guided so as to stop within the direct field of vision, and the visibility at the part on which the operator keeps his/her eyes can be improved.

Modifications

The present disclosure may be modified and/or changed in various ways without being limited to the implementations described above, and those modifications and changes are still deemed to be within the technical scope of the present disclosure.

(1) The configuration of the headlight device may be suitably changed without being limited to the implementations described above. For example, the types and numbers of the light sources and optical systems, as well as the approaches of changing the intensities and illuminating areas may be suitably changed. Although the high-intensity discharge bulbs are used as the light sources and the illuminating areas are changed using the variable shades in the implementations described above, the light source may be comprised of a plurality of arrayed LEDs, each of which illuminates a relatively small area in a spotting manner, and each illuminating area may be changed by turning on and off the corresponding LEDs, for example.

(2) The configurations of the sensors, the various devices, and the units which are connected with the headlight control unit in order to acquire the variety of information can be suitably changed.

(3) In the implementations described above, the laser beam is emitted at the peripheral edge of the direct field of vision in order to make the boundary between the direct field of vision and the indirect field of vision distinguishable, however, additionally or alternatively, the illuminating light color of the direct field of vision and the illuminating light color of the indirect field of vision may be differed from each other.

(4) Although the direct field of vision is set on the line extending in the traveling direction of the vehicle in Implementation 1, and the direct field of vision is set on the line of sight in Implementation 2, the direct field of vision may first be set on the line extending in the traveling direction like Implementation 1, and may then be corrected and shifted onto the line of sight according to the detected result of the line of sight.

The invention claimed is:

1. A vehicle headlight device, comprising:
a variable light distribution mechanism that is able to change an illuminating area of light emitted ahead of a vehicle equipped with the vehicle headlight device from at least one light source, and is able to illuminate part of the illuminating area at a higher intensity than other parts;
a direct field of vision estimator that estimates a direct field of vision on which a vehicle operator is assumed to keep his/her eyes within an area ahead of the vehicle, the direct field of vision estimator estimating the direct field of vision based on a shape of a lane ahead of the vehicle as detected by a lane shape detector and also based on an area through which the vehicle will pass after a predetermined period of time;
a light distribution controller that sets the illuminating area so as to contain the direct field of vision estimated by the direct field of vision estimator, and controls the variable light distribution mechanism to illuminate the direct field of vision at a higher intensity than an indirect field of vision around the direct field of vision; and
a laser beam emitter that emits a laser beam along a boundary between the direct field of vision and the indirect field of vision.

2. The vehicle headlight device of claim 1, wherein the direct field of vision estimator changes the direct field of vision so as to be relatively displaced forward of the vehicle and smaller as a traveling speed of the vehicle increases.

3. The vehicle headlight device of claim 2, wherein
the at least one light source comprises multiple light sources including a light source that illuminates the indirect field of vision, and
the light distribution controller causes the light source which illuminates the indirect field of vision to blink at a predetermined cycle.

4. The vehicle headlight device of claim 2, wherein the light distribution controller controls the variable light distribution mechanism to illuminate the direct field of vision with light of a color different from a color of light illuminating the indirect field of vision.

5. The vehicle headlight device of claim 2, further comprising a laser beam emitter that emits a laser beam along a boundary between the direct field of vision and the indirect field of vision.

6. The vehicle headlight device of claim 1, wherein the light distribution controller reduces the intensity at the indirect field of vision as a traveling speed of the vehicle increases.

7. The vehicle headlight device of claim 1, wherein
the at least one light source comprises multiple light sources including a light source that illuminates the indirect field of vision, and
the light distribution controller causes the light source which illuminates the indirect field of vision to blink at a predetermined cycle.

8. The vehicle headlight device of claim 1, wherein the light distribution controller controls the variable light distribution mechanism to illuminate the direct field of vision with light of a color different from a color of light illuminating the indirect field of vision.

9. The vehicle headlight device of claim 1, wherein the light distribution controller increases a difference in the intensity between the direct field of vision and the indirect field of vision as a traveling speed of the vehicle increases.

10. A vehicle headlight device, comprising:
a variable light distribution mechanism that is able to change an illuminating area of light emitted ahead of a vehicle equipped with the vehicle headlight device from at least one light source, and is able to illuminate part of the illuminating area at a higher intensity than other parts;
a direct field of vision estimator that estimates a direct field of vision on which a vehicle operator is assumed to keep his/her eyes within an area ahead of the vehicle;
a light distribution controller that sets the illuminating area so as to contain the direct field of vision estimated by the direct field of vision estimator, and controls the variable light distribution mechanism to illuminate the direct field of vision at a higher intensity than an indirect field of vision around the direct field of vision; and
a laser beam emitter that emits a laser beam along a boundary between the direct field of vision and the indirect field of vision.

11. The vehicle headlight device of claim 10, wherein
the at least one light source comprises multiple light sources including a light source that illuminates the indirect field of vision, and
the light distribution controller causes the light source which illuminates the indirect field of vision to blink at a predetermined cycle.

12. The vehicle headlight device of claim 10, wherein the light distribution controller controls the variable light distribution mechanism to illuminate the direct field of vision with light of a color different from a color of light illuminating the indirect field of vision.

13. The vehicle headlight device of claim 10, wherein the light distribution controller increases a difference in the intensity between the direct field of vision and the indirect field of vision as the traveling speed of the vehicle increases.

14. The vehicle headlight device of claim 10, wherein the direct field of vision estimator changes the direct field of vision so as to be relatively displaced forward of the vehicle and shorter, in a direction of travel, as a traveling speed of the vehicle increases; the light distribution controller reduces the intensity at the indirect field of vision as the traveling speed of the vehicle increases.

* * * * *